July 8, 1924. 1,500,716

W. POPENDICK

AUTO WHEEL

Filed Oct. 11, 1922

W. Popendick,
Inventor

Patented July 8, 1924.

1,500,716

UNITED STATES PATENT OFFICE.

WILLIAM POPENDICK, OF DECATUR, MICHIGAN.

AUTO WHEEL.

Application filed October 11, 1922. Serial No. 593,743.

*To all whom it may concern:*

Be it known that I, WILLIAM POPENDICK, a citizen of the United States, residing at Decatur, in the county of Van Buren and State of Michigan, have invented a new and useful Auto Wheel, of which the following is a specification.

This invention relates to spring wheel constructions, the primary object of the invention being to provide a spring wheel having resilient qualities equal to a wheel supplied with a pneumatic tire.

Another object of the invention is to provide a wheel construction wherein the spring spokes thereof may be readily and easily removed and replaced when the same become broken or otherwise rendered inoperative.

A still further object of the invention is the provision of an adjustable hub, thereby adapting the wheel for use in connection with axles of various diameters.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
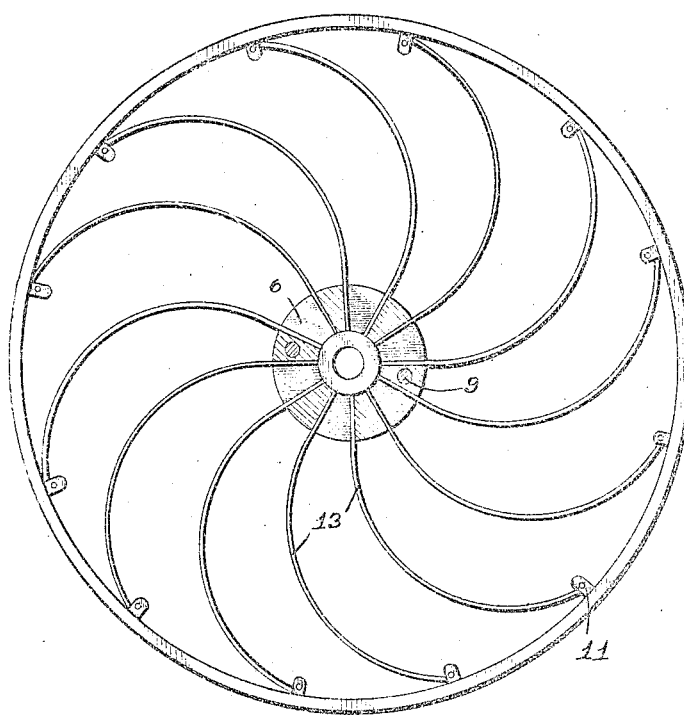
Figure 1 is a side elevational view of a spring wheel constructed in accordance with the invention.
Figure 2:
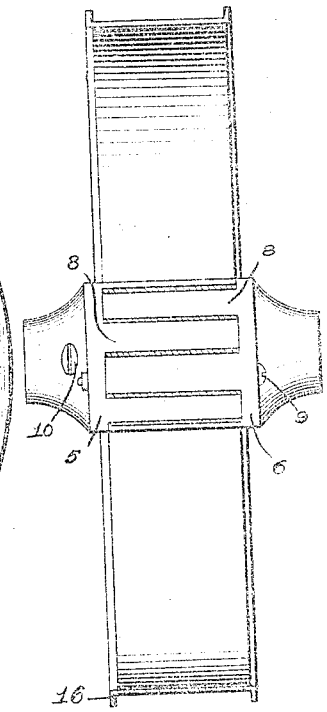
Figure 2 is a vertical sectional view through the wheel, the hub sections thereof being shown in elevation.
Figure 3:
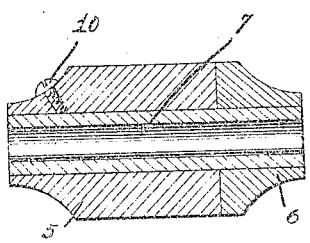
Figure 3 is a sectional view through the hub.
Figure 5:
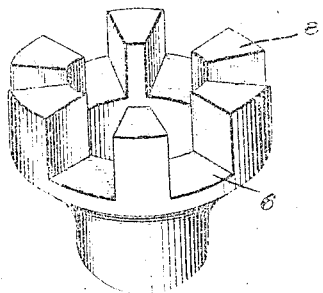
Figure 5 is a perspective view disclosing one of the hub sections.
Figure 4:
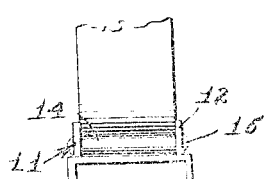
Figure 4 is a detail view disclosing the means for connecting the outer ends of the spokes to the felloe of the wheel.

Referring to the drawing in detail, the wheel embodies a hub including opposed sections 5 and 6 and a central section 7, providing a bearing for the wheel proper.

Each of the sections 5 and 6 is formed with inwardly extending spaced fingers 8, which fingers have their side walls tapered towards the opening of the section so that when the sections are brought together, in a manner to be hereinafter described, the spokes which are supported between the sections, are securely gripped between the fingers, and held in position.

Bolts 9 extend through the hub sections to secure the sections together, and prevent the same from becoming disconnected. A screw 10 extends through one of the hub sections and has its inner end contacting with the central section 7 to secure the central section within the hub sections. Thus it will be seen that due to this construction, the central section 7 will be readily removed and replaced by a central section having a larger opening, adapting the device for use in connection with axles of various diameters.

The spokes 13 which form an important feature of the invention are curved as clearly shown by Figure 1 of the drawing, the inner ends of the spokes being positioned between the fingers 8 of the hub sections in a manner to securely clamp the spokes between the sections.

The outer ends of the spokes have connection with the inner surface of the felloe of the wheel as by means of the bracket members 11, each of which comprising a body portion and laterally extending ears 12, the body portions of the brackets being bolted or otherwise secured to the inner surface of the felloe of the wheel.

The outer end of each spoke is formed into a tubular member 14 which tubular member has its ends disposed between the ears 12 of the bracket member associated therewith. A suitable bolt 15 connects the ears of each bracket member, and extends through the tubular member 14 associated therewith to secure the spokes to the felloe.

The periphery or the opposite side of the felloe is formed with flanges 16 which provide an anti-skid surface for the wheel, and prevent lateral movement of the wheel when the same is in use.

Having thus described the invention, what is claimed as new is:—

In a hub for wheels having metallic spokes, hub sections, each of said hub sections including spaced fingers formed with inclined side walls, said sections adapted to be moved into engagement with each other and the fingers of one section positioned between the fingers of the opposed section, said spokes having their inner ends positioned between the adjacent fingers of the hub to hold the fingers in position, and a tubular member providing a bearing positioned in the hub section.

In testimony that I claim the foregoing as my own, I have hereto affixed my signature in the presence of two witnesses.

WILLIAM POPENDICK.

Witnesses:
GEO. T. POMEROY,
F. E. LINDSLEY.